(No Model.)

G. VEALE, Jr.
WASTE PIPE TRAP.

No. 354,075. Patented Dec. 7, 1886.

Witnesses
John E. Parker
David S. Williams

Inventor:
George Veale, Jr
by his Attorneys
Howson & Sons

UNITED STATES PATENT OFFICE.

GEORGE VEALE, JR., OF PHILADELPHIA, PENNSYLVANIA.

WASTE-PIPE TRAP.

SPECIFICATION forming part of Letters Patent No. 354,075, dated December 7, 1886.

Application filed September 13, 1886. Serial No. 213,414. (No model.)

*To all whom it may concern:*

Be it known that I, GEORGE VEALE, Jr., a citizen of the United States, residing in Philadelphia, Pennsylvania, have invented certain Improvements in Waste-Pipe Traps, of which the following is a specification.

The object of my invention is to construct an effective trap for waste or sewer pipes, which will not become clogged up by the accumulation of fats, dirt, or other sedimentary matter; and this object I attain in the manner which I will now proceed to describe.

Figure 1:
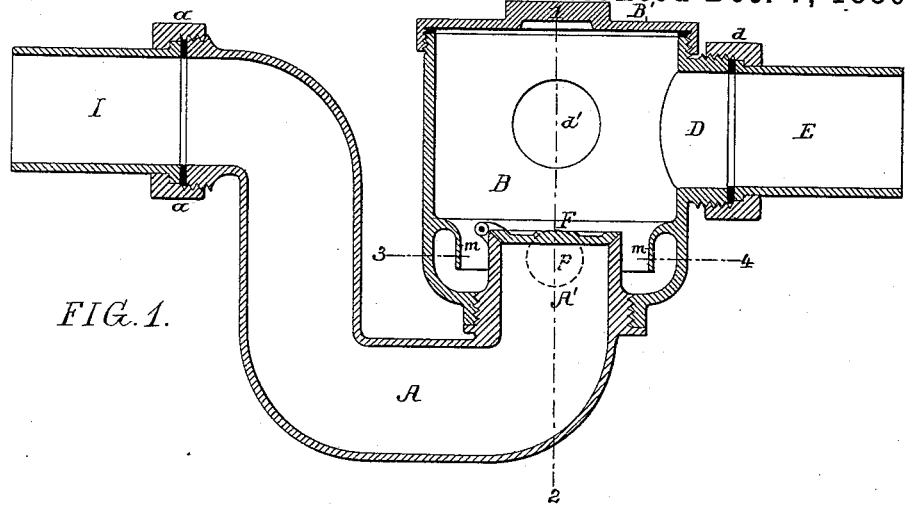
Figure 2:
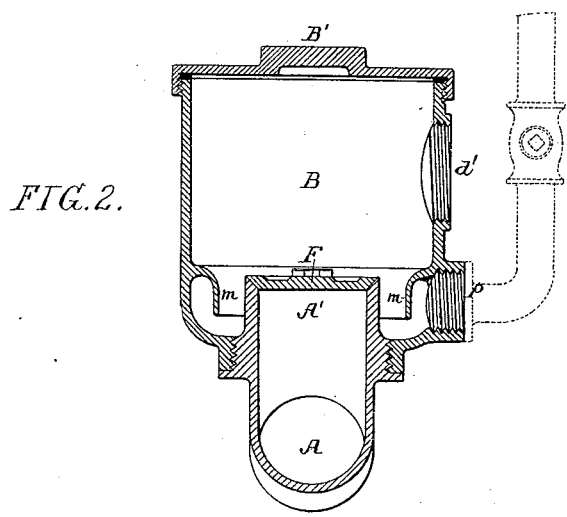
Figure 3:
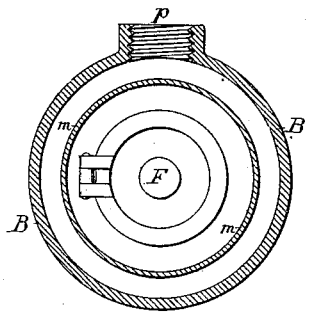

In the accompanying drawings, Figure 1 is a longitudinal section of my improved trap. Fig. 2 is a transverse section on the line 1 2, Fig. 1; and Fig. 3 is a sectional plan view on the line 3 4, Fig. 1.

A is the body of the trap, having connected to it at the inlet end by a suitable coupling, $a$, the inlet-pipe I, while the opposite end, A', of the pipe is screw-threaded into the bottom of the box B. The top of this box is closed by a removable cover, B', and on the side is a threaded outlet-pipe, D, to which is connected by a suitable coupling, $d$, the escape-pipe E.

The end A' of the trap A which is fitted into the bottom of the box projects upward within the latter some distance above the bottom thereof and is provided with a hinged or flap valve, F, having a ground-joint seat on the top of the trap A. This valve thus forms a trap supplementary to the main trap A.

Into the lower portion of the box B opens a pipe, $p$, which is provided with a valve, as indicated by dotted lines in Fig. 2, and which, in connecting up the trap in a house, would be in communication with the hot-water pipes. Just above the level of this pipe $p$, within the box, is an annular depending flange, $m$, which projects down toward the rounding bottom of the box, around the upwardly-projecting end A' of the trap-pipe A, so that any accumulation of any sedimentary matter can be quickly flushed out by turning on the water from the pipe $p$, and if this sedimentary matter be fat which has solidified, the hot water will melt and drive it out through the outlet of the box.

I prefer to provide the box with an additional outlet, $d'$ having a suitable pipe fitted into it to carry off the gases from the trap; but this is not essential.

I claim as my invention—

A waste or sewer trap having a box into which one end of the trap projects, and which is provided with a flushing-pipe opening into the bottom of the box, and with an annular dependent flange over the said opening and around the projecting end of the trap, all substantially as set forth.

In testimony whereof I have signed my name to this specification in the presence of two subscribing witnesses.

GEORGE VEALE, JR.

Witnesses:
WILLIAM D. CONNER,
HARRY SMITH.